Sept. 29, 1936.  C. J. COBERLY  2,055,481

METHOD OF AND APPARATUS FOR REDUCING SKIN FRICTION LOSSES

Filed Oct. 5, 1934   2 Sheets-Sheet 1

INVENTOR:
CLARENCE J. COBERLY.
By
Ford W. Lauie
ATTORNEY.

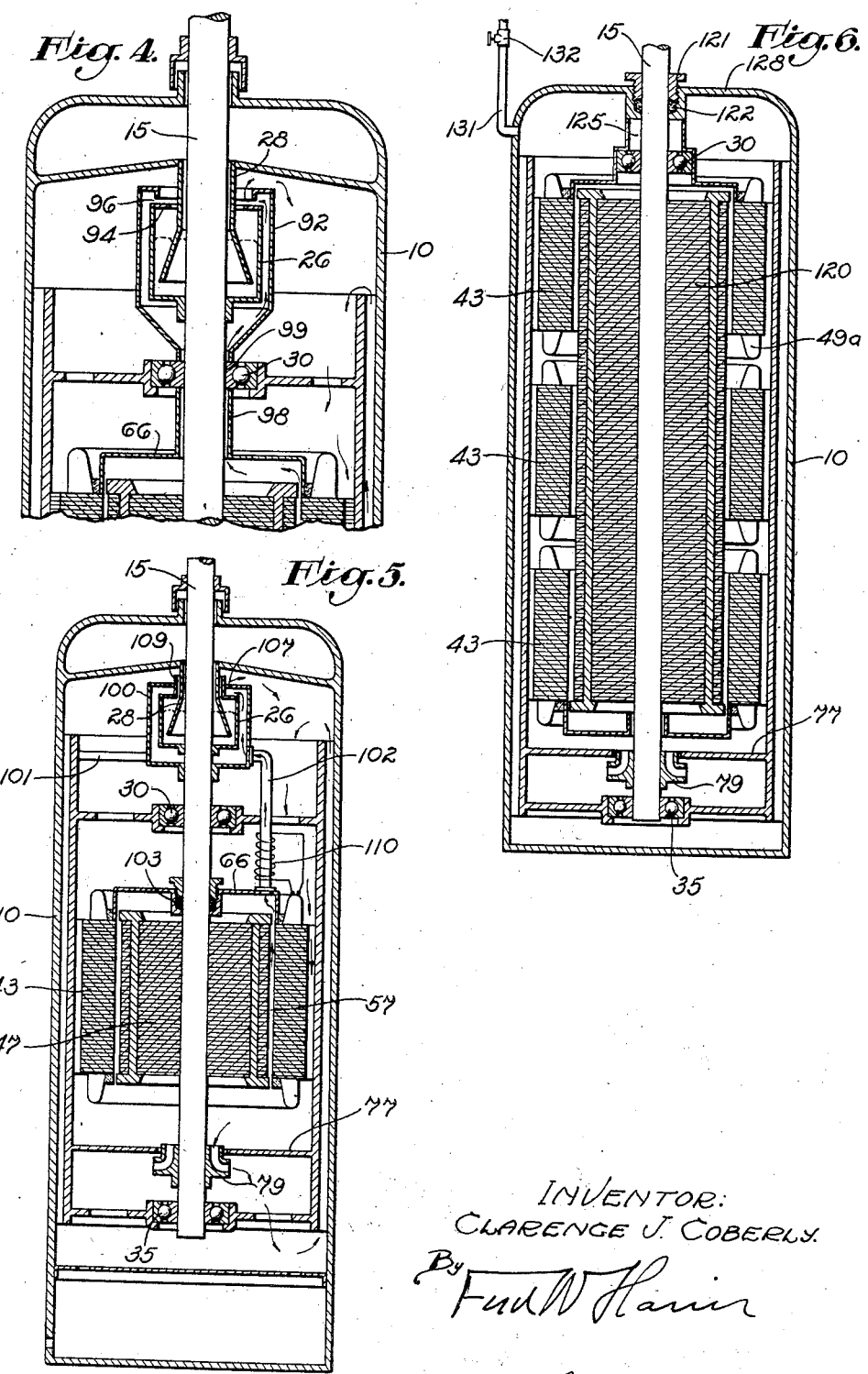

Patented Sept. 29, 1936

2,055,481

UNITED STATES PATENT OFFICE 2,055,481

METHOD OF AND APPARATUS FOR REDUCING SKIN-FRICTION LOSSES

Clarence J. Coberly, Los Angeles, Calif., assignor to Submersible Motorpump Co., Ltd., Huntington Park, Calif., a corporation of California Application October 5, 1934, Serial No. 746,971

19 Claims. (Cl. 172—36)

My invention relates to a novel method and apparatus for reducing friction losses between two members moving relative to each other, and more particularly to a novel method and apparatus for reducing skin-friction losses in a dynamo-electric machine.

In my co-pending application, Serial 627,180, is disclosed a method of reducing skin-friction losses in the gap between the rotor and the stator of a dynamo-electric machine. The system therein disclosed involves the use of a dielectric liquid which, under the conditions of temperature and pressure existing in the gap, expels a vaporous material which substantially fills the gap.

It is an object of the present invention to provide a novel method and apparatus for reducing skin-friction losses between any two bodies moving relative to each other.

It is a further object of the invention to provide a dynamo-electric machine, the gap of which is substantially filled with a vaporous material, and to use this vaporous material in reducing skin-friction losses in other portions of the dynamo-electric machine.

It is a further object of the invention to provide a dynamo-electric machine enclosed in a shell with a seal at the junction of the shell and the shaft of the dynamo-electric machine, and to conduct a vaporous material to this seal.

Another object of the invention lies in the provision of a heated or unheated passage communicating with the gap of a dynamo-electric machine to conduct a vaporous material to a rotating member forming a part of the seal.

It is a further object of the present invention to provide a novel throttle means through which the vaporous material may enter or leave the passage or the gap.

It is a further object of the invention to provide a bearing for journalling a shaft, and to either lubricate this bearing by a vaporous material or to by-pass the vaporous material around the bearing.

The invention also includes among its objects the provision of a novel circulation and cooling system particularly applicable to systems utilizing the vaporous material for decreasing skin-friction losses but not limited in utility thereto.

It is a further object of the invention to provide a novel construction for a dynamo-electric machine involving the use of a plurality of spaced stators or a plurality of spaced rotors or both.

It is a further object of the invention to provide a novel gap construction for such a dynamo-electric machine, the stator structure or rotor structure or both being formed in a plurality of parts.

Further objects and advantages of the invention will be made evident to those skilled in the art from the following description of several embodiments of the invention particularly applied to the submersible motor art.

Referring to the drawings,

Figs. 3 and 4 are fragmentary views illustrating alternative forms of the invention.

Figs. 5 and 6 are vertical sectional views of other embodiments of the invention applied to a submersible motor.

In the submersible motor art it is desirable to be able to effectively seal the working parts of the motor from the external liquid in which the motor is submerged, especially if the motor is submerged in water or other material which would be injurious to the working parts of the motor should it come in contact therewith. This is usually accomplished by positioning the motor elements in a suitably sealed shell. In addition, it is desirable to maintain in this shell a suitable liquid, usually of high dielectric strength, to protect and cool the motor and to lubricate the bearings. If, however, this dielectric liquid is allowed to fill the gap between the rotor and the stator, skin-friction losses will be high, especially on larger installations and on those installations where it is desirable to develop high shaft-speeds. This loss varies as the third power of the speed and as the fourth power of the diameter of the rotor, and it thus becomes very important to minimize these losses on larger installations unless overall efficiency is to be materially reduced.

Figure 1:
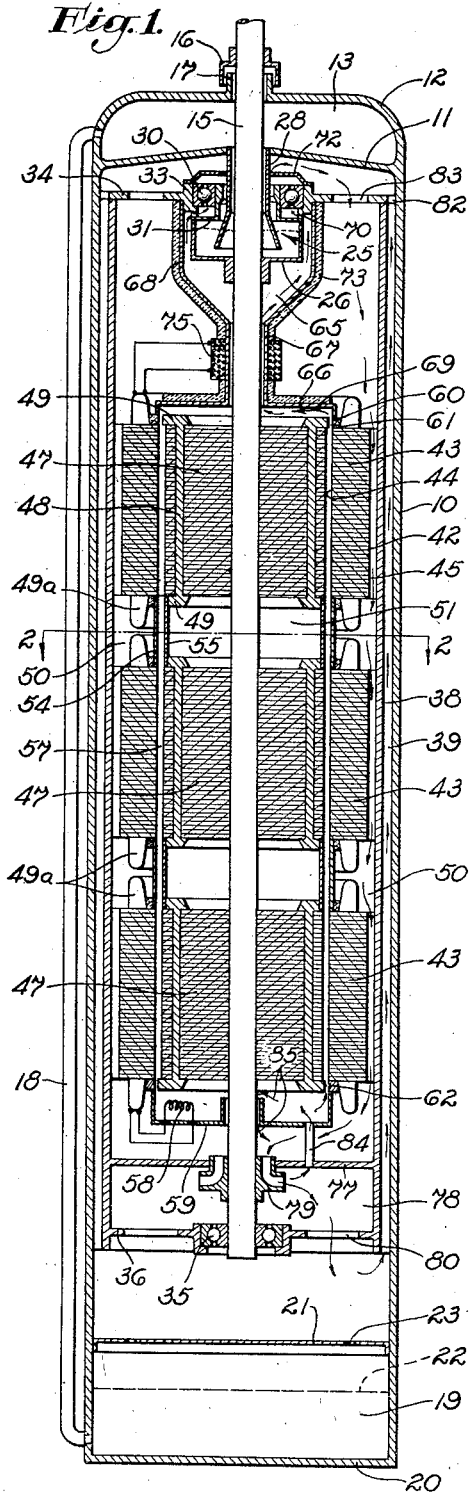
Fig. 1 is a vertical sectional view of one embodiment of the invention applied to a submersible motor.

In the embodiment shown in Fig. 1 the submersible motor is shown as including a shell 10 adapted to be submerged in any cool liquid such as water. This shell may be closed at its upper end by a wall 11 directly contacted by the water, but I prefer to utilize a dome 12 above this wall and cooperating therewith in defining a chamber 13. A shaft 15 of the motor extends through the wall 11 and the dome 12. An inverted cup 16 may be carried by the shaft to extend downward around a tubular member 17 of the dome 12 to prevent entry of sand into the chamber 13. Water or other external liquid can, however, enter this chamber, moving beneath the inverted cup 16 and through the small annular space between the shaft 15 and the tubular member 17.

If desired, the chamber 13 may be in open communication through a pipe 18 with the lower end of a balance chamber 19 formed between a lower wall 20 of the shell 10 and a baffle 21. A lower portion of this balance chamber may thus contain a body of water, the upper portion containing a body of dielectric liquid of a character to be hereinafter described, the surface of contact being indicated by dotted lines 22. Openings 23 are provided in the baffle 21 to permit communication between the balance chamber 19 and the upper interior of the shell 10. The use of a balance chamber, or a balance chamber communicating with the chamber 13 is not, however, essential to the utility of the invention, though this construction has been found to be particularly desirable in submersible motor installations.

The junction of the shaft 15 and the shell 10 is preferably closed by a suitable seal which prevents entry of water or other external liquid into the upper end of the shell. Such a seal is indicated in general by the numeral 25 and may take any one of a various number of forms. In the embodiment shown this seal is of the liquid type, including a rotatable cup 26 suitably secured to the shaft and containing a body of mercury or other sealing liquid, this cup forming the rotatable member of the seal. An apron 28 may be suitably secured to the wall 11 to form a stationary member of the seal. As disclosed, this apron is flared at its lower end and terminates at a position beneath the surface of the mercury or other sealing liquid, dividing this surface into an inner surface communicating with the water or other external liquid through the annular space between the apron and the shaft, and an outer surface communicating with the interior of the shell 10.

In the embodiment shown in Fig. 1, the upper end of the shaft 15 is journalled by a bearing 30 associated with the cup 26. This may be accomplished by the use of a bearing member 31 which partially closes the upper end of the cup 26 and provides an upward extending neck which retains the inner race of the bearing 30. The outer race of this bearing may be held in a suitable socket 33 supported on a plate 34 extending across the shell 10. A similar bearing 35 may be used at the lower end of the shaft, being supported on a suitable plate 36.

Figure 2:
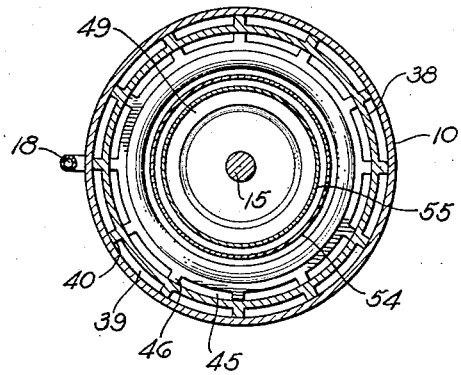
Fig. 2 is a sectional view taken on the line 2—2 of Fig. 1.

Positioned immediately inside the shell 10 is a liner 38 which cooperates therewith in providing one or more circulation passages 39. As best shown in Fig. 2, the liner 38 may provide fins 40 which engage the shell 10, the space between these fins providing the circulation passages 39.

Suitably secured inside the liner 38 is a dynamo-electric machine shown in the form of a motor 42. If desired, this motor may be of conventional construction, including a single rotor and a stator, the rotor being secured to the shaft 15. However, in larger installations involving the generation of considerable power, the rotor and stator must be relatively long, especially if space considerations are limited as in a deep-well installation. Great difficulty is encountered in winding such a long stator. For this reason, and other reasons which will be made apparent, I prefer to form the rotor structure and the stator structure or both of a number of individual units. Thus, the stator structure disclosed includes three stators 43, each providing a rotor opening 44, these rotor openings being in alignment with each other. The stators may be of the conventional can construction, but are preferably spaced from the liner 38 to provide one or more circulation passages 45. In the embodiment shown, fins 46 extend outward from the stator to retain this stator in place, the spaces between these fins forming the circulation passage 45. Similarly, the rotor construction illustrated includes three rotors 47 of the squirrel-cage type, including conductor bars 48 and end rings 49 in which heavy currents are induced when stator windings 49a are energized.

The stators 43 are spaced from each other by spaces 50 of sufficient dimension to accommodate those portions of the stator windings 49a which extend from the magnetic body thereof. Similarly, the rotors 47 are spaced from each other by spaces 51 so that one of the rotors 47 is positioned in the rotor opening 44 of each stator 43.

While such a unit-construction of either the rotor or the stator may be used in this form, I prefer to provide walls associated with the stators and with the rotors for bridging the spaces 50 and 51. Thus, a cylindrical member 54 is shown as extending between each of the stators 43 inside the exposed portions of the windings 49a. The internal diameter of these cylindrical members are preferably the same or approximately the same as the diameter of the rotor openings 44. Any suitable means may be utilized for retaining the cylindrical members 54 in position between adjacent stators. Thus, a suitable clamping means may be used to force the stators toward each other, or these stators may be pressed into the liner 38 with the cylindrical members 54 in position. Rings of insulating material may be positioned adjacent each stator winding and of such inner diameter as to retain the ends of the cylindrical members 54 as shown. Similarly, cylindrical members 55 bridge the spaces 51 between adjacent rotors 47, the external diameter of these members being approximately the same as the diameter of the rotor. If desired, the adjacent end rings 49 may be formed of a diameter to extend into the cylindrical members 55, thus retaining these members in position. These cylindrical members 55 also act as spacers for the rotors 47. Both the cylindrical members 54 and 55 are preferably formed of non-conducting material such as hard rubber, "bakelite" or other molded insulating material.

It will thus be apparent that a continuous gap 57 is formed between the rotor structure and the stator structure, in the embodiment shown this gap including the spaces between the rotors 47 and their corresponding stators 43 and the spaces between the cylindrical members 54 and 55. In other instances it is possible to extend all or a part of the cylindrical members 54 and 55 completely through the rotor openings 44 of all of the units, but such a structure is often undesirable in that it changes the electrical characteristics of the motor units.

It is very desirable to prevent the gap 57 from becoming filled with a liquid, for otherwise excessive skin-friction losses will be developed. One method of accomplishing this result is to maintain the gap substantially filled with a vaporous material. A means for accomplishing this result may include two elements: (1) a dielectric liquid capable when heated of giving off a vaporous material, and (2) a heating means for heating this dielectric liquid to such a temperature that the vaporous material is expelled.

In selecting the dielectric liquid capable of producing such a vaporous material, consideration must be given to the fact that existing gap temperatures should be sufficient to cause this expelling of the vaporous material. In some instances it is entirely possible to utilize as a dielectric liquid one of the lower boiling-point hydrocarbons which has a sufficient dielectric strength and which will vaporize when subjected to the temperatures in the gap, the vapors substantially filling the gap and comprising the vaporous material hereinbefore mentioned. Such a dielectric may be a gasoline suitably refined to give it the necessary dielectric strength. If desired, the lubricating qualities of such a low boiling-point hydrocarbon may be increased by adding small amounts of oil.

In another instance the dielectric liquid may include a conventional transformer oil or other carrier liquid of high dielectric strength in which has been dissolved a quantity of an auxiliary substance, such as one or more of the more volatile hydrocarbons. Small quantities of auxiliary substances such as ethane, propane, butane, pentane, hexane, ethylene, propylene, butylene, amylene, etc., may be used, or certain of the gasolines can be used in this capacity, as well as other low boiling-point hydrocarbons. Commercial petroleum ether has been found to be very satisfactory, though various other substances can be successfully used. The auxiliary substance utilized, as well as the quantity thereof mixed with the transformer oil, should be determined with reference to the available temperatures in the gap and the other conditions existing in the installation, the end in view being to cause the dielectric liquid (in this instance the transformer oil and the auxiliary substance) to give off a vaporous material at the temperatures existing in the gap. In this instance the vaporous material will be essentially formed by the vapors given off from the auxiliary substance.

In other instances the auxiliary substance need not comprise a liquid but may be in the form of a gas dissolved in the transformer oil, for instance. The resulting dielectric liquid should be compounded with the end in view that at least a portion of the gas will be liberated at gap temperatures.

Thus, the term "vaporous material" is used in this application to include the material given off by the dielectric liquid, whether this material is a vapor formed by volatilization of the entire dielectric liquid, or whether it is a vapor developed essentially by the vaporization of the auxiliary substance, or whether it is a gas expelled from the dielectric liquid. In addition, it sometimes happens that the entire gap is not completely filled with the vapor, or the gas, due to the presence in this gap of minute quantities of liquid which, due to the agitation therein, may form a foam. Such a foam is, however, predominantly vapor or gas, and the term "vaporous material" as herein used is intended to cover such foams. Similarly, the term "dielectric liquid" has been used to include either a low boiling-point hydrocarbon with or without small quantities of oil therein, or a solution of dielectric oil and an auxiliary liquid such as petroleum ether, or a dielectric oil in which is retained or dissolved a gas, or other equivalent materials or compounds of a dielectric nature.

The vaporous material may be given off by such a dielectric liquid either in the gap or exterior of the gap. In the former instance the lower end of the gap can be made to open directly on the dielectric liquid in the shell 10, and that portion of the dielectric liquid which enters the gap will be subjected to gap temperatures so as to expel the vaporous material. In this connection, the requisite heat will be supplied by the rotors and stators of the motor thus acting as a heating means. In this capacity it is clear that the stator windings develop considerable heat due to the $I^2R$ losses therein, while the heavy currents flowing through the rotor windings will also develop $I^2R$ losses which further tend to heat the gap. In addition, other losses in the stator and rotor, such as losses due to eddy currents and hysteresis, are available for heating the gap.

If, however, the quantity of heat available in the gap is not sufficient to expel the desired amount of vaporous material, or if it is desired to expel the vaporous material exterior of the gap, an auxiliary heater such as indicated by the numeral 58 may be used. If this is the case, it is preferable to utilize a baffle 59 extending below the lowermost stator 43, the heater being positioned between the lowermost rotor and this baffle. A baffle formed of cup shape as indicated in Fig. 1 is usually very satisfactory and permits retention of a portion of the dielectric liquid in the lower end thereof.

The vaporous material tends to move upward in the gap 57 due both to its low density and to the agitation or pumping action of the rotor structure. If desired, this vaporous material may be discharged directly from the upper part of the gap into the dielectric liquid filling the upper part of the shell 10. As soon as this vaporous material leaves the gap it is suddenly cooled by coming into contact with the dielectric liquid exterior of the gap, and the vaporous material reunites with the dielectric liquid so as in effect to produce a thermal cycle, the vaporous material being first formed and later condensed or otherwise reunited with the cool dielectric liquid. With such a system it is often desirable to utilize a throttle means at one or both ends of the gap 57. In the embodiment shown, the uppermost end ring 49 extends outward a slight distance beyond the periphery of the rotor and toward a ring 60 preferably of insulating material retained immediately inside the stator winding, thus forming a restricted passage 61 acting as a throttle means for the upward moving vaporous material. A similar throttle means may be formed adjacent the lowermost end ring 49 of the lowermost stator, as shown, thus forming a restricted passage 62 which throttles the dielectric liquid or the vaporous material entering the gap 57.

However, instead of discharging the vaporous material directly from the upper end of the gap 57 into the dielectric liquid, I prefer to utilize this already-formed vaporous material in further reducing skin-friction losses in the structure. Thus, my tests have shown that at high shaft speeds considerable skin-friction loss may be developed if that portion of the shaft 15 extending above the uppermost rotor is contacted by the dielectric liquid. Even greater losses may take place if the rotating member of the seal is allowed to remain in contact with the dielectric liquid. Thus, in Fig. 1 I have illustrated an enclosing structure including walls extending upward from the uppermost stator 43 around the shaft 15 and the rotating cup 26 to define a passage 65 which carries the vaporous material upward to a position adjacent the seal. These walls may take the form of a baffle 66 extending upward from the ring 60 and inward toward the shaft, and may include a pipe 67 around the shaft and flared at its upper end to form a sleeve 68 which extends upward to the plate 34 in spaced relationship with the rotating cup 26. The vaporous material thus rises from the gap as indicated by the arrows 69 and flows upward through the passage 65, thus maintaining the shaft and the rotating cup 26 surrounded by vaporous material rather than dielectric oil.

A suitable throttle means may be provided at the upper end of the passage 65 for throttling the upward flow of vaporous material. In Fig. 1, two such throttle means are shown, it being possible to use either or both. The first of these throttle means is formed by a lip 70 depending from the socket 33 and terminating a short distance from the bearing member 31, thus defining a narrow passage bounded by rotating and stationary walls which throttles the upward flow of the vaporous material before this material moves through the bearing 30. The second throttle means may include a cap 72 secured to the socket 33 and extending inward toward the apron 28, but terminating short thereof to provide a restricted passage bounded by stationary walls which acts to throttle the vaporous material. Regardless of which throttle means is used, or whether both throttle means are used simultaneously, the vaporous material will be discharged into the dielectric liquid in the upper part of the shell 10 and will be reunited therewith when it contacts the cool dielectric liquid.

If desired, the walls 66, 67, and 68, or any of them, can be heat-insulated as indicated by the numeral 73, so that the vaporous material therein will not be chilled during movement through the passage 65. In other instances it is possible to utilize an auxiliary heater 75 around the pipe 67 or adjacent any portion of the walls defining the passage 65 so as to reheat the vaporous material to prevent condensation thereof. The heaters 58 and 75 may be energized in any desired manner, or can be individually or collectively controlled by suitable switch means not shown. However, it is usually satisfactory to connect one or both of these heaters to the stator windings 49a so that when these stator windings are energized by any suitable means not shown, the heaters connected thereto will also be energized.

To efficiently cool the motor 42 and to insure that the vaporous material will be reunited with the dielectric liquid, I provide a novel circulation system for the dielectric liquid. In this connection a plate 77 may extend across the liner 38, cooperating with the plate 36 in defining a discharge chamber 78. A suitable pump of low pressure-head is shown as being in the form of a centrifugal impeller 79 with its eye extending into an opening of the plate 77 and secured to the shaft 15. Rotation of the shaft thus forces dielectric liquid into the discharge chamber 78 and through openings 80 formed in the plate 36 and thence upward through the circulation passages 39 where it is very effectively cooled, the heat being conducted through the shell 10 and to the surrounding liquid. This liquid moves from the upper ends of the circulation passages 39 through openings 82 in the plate 34 and then flows downward through openings 83 therein, flowing downward through the circulation passages 45 previously described and entering the intake of the impeller 79. Such a circulation system very effectively cools the working parts of the motor. In addition, the pumping action of the impeller 79 can be used to renew the liquid in the cup formed by the baffle 59. In this connection a small pipe 84 may communicate between the discharge chamber 78 and the upper portion of the baffle 59. Any excess liquid delivered to this baffle will be discharged as indicated by the arrows 85.

Figure 3:
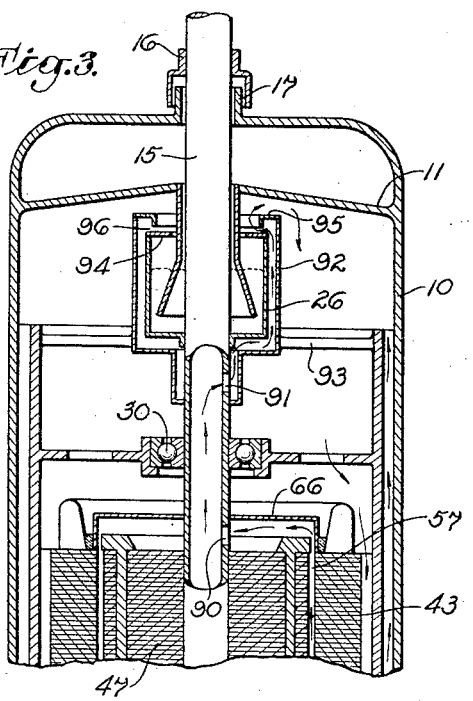

In the embodiment shown in Fig. 1, the vaporous material is utilized for lubricating the bearing 30. In some instances it is desirable to utilize the dielectric liquid itself for lubricating this bearing. Such a system is shown in Fig. 3. Here the vaporous material rising from the gap 57 is guided by the baffle 66 through a shaft port 90. The shaft 15 is hollow for at least a portion of its length, the vaporous material moving upward therein and outward through a port 91 into the space around the rotating cup 26, this space being defined by a member 92 held stationary by arms 93. The bearing 30 in this instance is directly exposed to the dielectric liquid in the upper part of the shell 10, the vaporous material being by-passed around the bearing. So also, in Fig. 3 a slightly different throttle means is illustrated, being formed between a cover 94 of the cup 26 and a depending lip of a cover 95 for the member 92. A restricted passage 96 is thus formed which acts to throttle the vaporous material moving as indicated by the arrows.

Another method of by-passing the vaporous material around the bearing 30 is illustrated in Fig. 4 and does not require the use of a hollow shaft. This form is substantially identical with that shown in Fig. 3 with the exception that the tube 98 extends upward from the baffle 66 into close proximity to the inner race of the bearing 30, leaving an annular space around the shaft. The inner race of the bearing 30 provides one or more grooves 99 which conduct the vaporous material upward therethrough as indicated by the arrows, this vaporous material being discharged through the restricted passage 96 as previously described.

In Fig. 5 an alternative system for by-passing the vaporous material around the bearing 30 is illustrated. Here a stationary enclosing structure 100 supported on arms 101 surrounds the rotating cup 26, forming a space therearound which cooperates with the interior of a pipe 102 and the space immediately below the baffle 60 with which the pipe 102 communicates in defining a passage which conducts the vaporous material upward to surround the rotating cup 26. A seal 103 may be used around the shaft adjacent the baffle 60, but this is not always essential. A throttle means 107 is formed between an inward extending edge of the top of the enclosing structure 100 and a neck 109 of the cover for the rotating cup 26, this neck extending to a point preferably above the top of the enclosing structure 100. Auxiliary heating of the vaporous material to prevent excessive condensation thereof in the passage may be effected through a heating coil 110 around the pipe 102 or otherwise adjacent the walls defining the passage which conducts the vaporous material upward.

So also in Fig. 5 only one rotor-stator unit is shown, illustrating how the principles of the invention can be applied to such a construction for smaller installations. The baffle 59 shown in Fig. 1 is also dispensed with, and the vaporous material is given off either in the gap 57 or immediately therebelow due to the heat imparted to the dielectric liquid by the windings of the rotor and stator.

In Fig. 6 an alternative form of structure is shown involving a single, relatively long rotor 120 which takes the place of the unit rotor construction shown in Fig. 1. Such a rotor can be used in conjunction with the stator structure shown in Fig. 1, or the cylindrical members 54 may be dispensed with as shown in Fig. 6, in which event the gaps formed in the individual stators will act individually to expel the vaporous material from the dielectric liquid entering therein or coming adjacent thereto. Further, the exposed portions of the stator windings 49a serve to guide upward into the upper gaps any vaporous material expelled in the lower gaps.

So also, in Fig. 6 a different type of sealing means is shown comprising a stuffing box including a gland 121 compressing a packing 122 around the shaft 15. A passage 125 conducts the vaporous material upward from the uppermost gap, through the bearing 30, and to the seal 122. Thus, if desired the seal can be made to separate the external liquid and the vaporous material.

Furthermore, in the form shown in Fig. 6 no balance chamber is used. Thus, when the vaporous material is liberated the pressure inside the shell 10 may increase to a value above the pressure of the external liquid, thus insuring that any leakage through the seal will be outward rather than inward. This leakage may be either a leakage of the vaporous material or, if partial or complete condensation takes place in the passage 125, a portion of the condensate may be discharged through the seal if a sufficient pressure differential is developed. If desired, the dielectric liquid in this instance need not completely fill the interior of the shell 10, thus leaving an air space above the dielectric liquid and below the member 128 which closes the upper end of the shell. As the vaporous material is thus formed this body may be slightly compressed. If the shell is completely filled with dielectric liquid, formation of the vaporous material is impeded due to the fact that the dielectric liquid is substantially incompressible.

If, however, it is desired that the shell be substantially filled with dielectric liquid, a pipe 131 may extend upward, communicating at its lower end with the interior of the shell 10 and extending upward, usually to a point above the level of the external liquid; e. g., the level of the liquid in the well if the motor is used in a deep-well installation. This pipe may be only partially filled with the dielectric liquid; for instance, to a level approximately the same or slightly above the level of the external liquid. Liberation of the vaporous material in the shell 10 may thus force a portion of the dielectric liquid upward in the pipe 131 to raise the level thereof and develop a pressure-head which is greater than the pressure-head of the external liquid adjacent the seal, thus obtaining the pressure differential previously mentioned. A valve 132 may be used near the upper end of this pipe. If closed, a body of air will be entrapped in the pipe 131 between the surface of the dielectric liquid therein and the valve 132 and will be compressed as the vaporous material is given off. If opened, air may move into and from the upper end of the pipe 131 as the level of the dielectric liquid therein changes. The valve 132 may also be used for throttling such a flow of air into and from the pipe 131. This pipe may also be used for initially supplying the dielectric liquid to the shell or for supplying additional dielectric liquid thereto. If the vaporous material escapes from the shell 10 in any appreciable degree through the seal or otherwise, it is entirely possible to add additional quantities of the auxiliary substance, such as petroleum ether, to the pipe to renew the supply of this substance in the dielectric oil, thus maintaining the properties of the dielectric liquid during the operation of the structure.

Various features of the invention are important, as has been hereinbefore pointed out. Among these features is the decrease in skin-friction losses resulting from the conducting of vaporous material upward to surround portions of the rotatable structure other than the rotor, and the delivery of the vaporous material to a section adjacent the seal. The circulation system for circulating the dielectric liquid is also a feature which I believe to be novel. So also, the unit construction of the motor elements is believed to be novel, and it should be clear that in some instances a unit rotor construction can be used regardless of whether or not the stator structure is of a unitary form. In other instances a stator structure formed in units can be used in conjunction with a single rotor. The system for forming a continuous passage through the rotor-stator units is also an important feature, though any or all of the cylindrical members 54 or 55 can sometimes be dispensed with without departing from the spirit of the invention.

While the invention has been particularly described with reference to a submersible motor, it will be clear that this has been done only for illustrative purposes and for definiteness. The invention is equally applicable to various dynamo-electric machines whether or not they are submerged in an external liquid, and is not limited in utility to vertical-shaft machines. Further, the invention finds utility in various other structures in which it is desirable to reduce skin-friction losses between members moving relative to each other.

I claim as my invention:

1. In a dynamo-electric machine, the combination of: a shell; a rotor in said shell; a shaft operatively connected to said rotor and extending from said shell; a seal for sealing the junction of said shaft and said shell; walls forming a passage in said shell immediately around said shaft and extending to said seal; and means for substantially filling said passage with a vaporous material, said means including a dielectric liquid in said shell in communication with said passage and capable when heated of giving off a vaporous material, and including a heating means for heating said dielectric liquid to a temperature sufficient to give off said vaporous material.

2. In a dynamo-electric machine, the combination of: a shell; a rotor and a stator in said shell and separated by a gap; a shaft operatively connected to said rotor and extending from said shell; a seal at the junction of said shaft and said shell and including a stationary member attached to said shell and a rotatable member attached to said shaft to rotate therewith; walls extending upward from said stator to define a passage communicating with said gap, said walls extending around said rotatable member of said seal whereby at least a portion of said rotatable member is in said passage; and means for substantially filling said gap and said passage with a vaporous material, said means including a dielectric liquid in said shell communicating with said gap and capable when heated of giving off a vaporous material, and including a heating means for heating said dielectric liquid to a temperature sufficient to give off said vaporous material.

3. A combination as defined in claim 2 in which said dielectric liquid fills the space between said walls and said shell, and including a throttle means adjacent said seal for throttling the flow of said vaporous material from said passage into said dielectric liquid between said walls and said shell.

4. In a dynamo-electric machine, the combination of: a shell; a rotor and a stator in said shell and separated by a vertically extending gap; a vertical shaft operatively connected to said rotor; a baffle structure extending upward from said stator to form a passage communicating with said gap; means for substantially filling said gap and said passage with a vaporous material, said means including a dielectric liquid in said shell and communicating with said gap and capable when heated of giving off a vaporous material and including a heating means for heating said dielectric liquid to expel vaporous material which substantially fills said gap and said passage and tends to move upward therein; and a stationary member spaced from said baffle structure at the upper end of said passage to form a throttle space throttling the flow of said vaporous material from said passage whereby said throttle space is bounded by stationary walls formed by said baffle structure and said stationary member.

5. In a dynamo-electric machine, the combination of: a shell; a rotor and a stator in said shell and separated by a gap; a shaft operatively connected to said rotor; bearing means journalling said shaft; walls defining a passage communicating with one end of said gap and extending beyond said bearing in by-passing relation therewith; and means for substantially filling said gap and said passage with a vaporous material, said means including a dielectric liquid in said shell in communication with said gap and capable when heated of giving off a vaporous material and including also a heating means for heating said dielectric liquid to a temperature sufficient to give off said vaporous material, said vaporous material substantially filling said gap and said passage.

6. A combination as defined in claim 5 including a seal at the junction of said shaft and said shell, said bearing means being between said rotor and said seal, and in which said passage by-passing said bearing extends to a section adjacent said seal whereby said vaporous material is conducted to said seal.

7. In a dynamo-electric machine, the combination of: a shell; a rotor and a stator in said shell and separated by a gap; walls defining a passage communicating with said gap and extending therefrom to conduct from the vicinity of said gap a material flowing therefrom; and means for substantially filling said gap with a vaporous material, said means including a dielectric liquid in said shell and capable when heated of giving off a vaporous material and including a heating means for heating said dielectric liquid to a temperature sufficient to give off said vaporous material, said heating means including means for heating said gap to said temperature and a heater adjacent said walls to heat the material in said passage.

8. A combination as defined in claim 7 in which said vaporous material moves upward through said gap when said rotor is moving, and in which said passage is above said gap to receive the vaporous material discharged from said gap.

9. In a dynamo-electric machine, the combination of: a shell; a rotor and a stator in said shell and separated by a gap; a rotatable member in said shell and driven by said rotor; walls extending inward from said stator and then along said rotatable member to define a passage around a portion of said rotatable member; and means for substantially filling said passage with a vaporous material, said means including a dielectric liquid in said shell in communication with said passage and capable when heated of giving off a vaporous material, and including a heater adjacent said walls defining said passage and maintaining in said passage a temperature sufficient to maintain same substantially filled with said vaporous material given off by said dielectric liquid.

10. In a dynamo-electric machine, the combination of: a shell; a rotor and a stator in said shell and separated by a gap; a shaft operatively connected to said rotor; bearing means journalling said shaft; walls defining a passage communicating with one end of said gap and communicating with the journalling surfaces of said bearing means; and means for substantially filling said gap and said passage with a vaporous material, said means including a dielectric liquid in said shell in communication with said gap and capable when heated of giving off a vaporous material and including also a heating means for heating said dielectric liquid to a temperature sufficient to give off said vaporous material, said vaporous material substantially filling said gap and said passage and entering said bearing means to lubricate same.

11. In a dynamo-electric machine, the combination of: a shell; a plurality of stators in said shell providing rotor openings in alignment with each other, said stators being spaced from each other to provide spaces therebetween; walls extending between adjacent stators in said spaces and forming a rotor passage extending through all of said stators; a rotor means in said rotor passage and cooperating with the walls thereof in defining a gap; and means for maintaining said gap substantially filled with a vaporous material, said means including a dielectric liquid in said shell in communication with said gap and capable when heated to a given temperature of giving off a vaporous material and including also a heating means for heating said dielectric liquid to a temperature sufficient to give off said vaporous material, said heating means including windings on each of said stators and extending in said spaces to maintain the temperature of said gap at least as great as said given temperature.

12. In combination in a dynamo-electric machine: a shell; a rotor and a stator in said shell; a dielectric liquid in said shell and capable when heated of giving off a vaporous material, said dielectric liquid including a dielectric oil and an auxiliary substance which will be expelled from said dielectric liquid by the application of heat; means for heating said dielectric liquid to expel said vaporous material; a seal communicating with said vaporous material; and means for supplying additional quantities of said auxiliary substance to said dielectric liquid to compensate for any escape of vaporous material from said shell as by leakage through said seal.

13. A method of reducing skin-friction losses in a gap of a dynamo-electric machine and adjacent a rotatable member associated therewith, which method includes the steps of: substantially filling said gap with a vaporous material formed by heating a dielectric liquid to a sufficient temperature to expel the vaporous material therefrom; conducting said vaporous material from one portion of said gap to a position in surrounding relationship with said rotatable member; applying heat to said vaporous material after it leaves said one portion of said gap; and subsequently cooling said vaporous material to reunite same with said dielectric liquid.

14. A method of reducing skin-friction losses in the gap of a dynamo-electric machine enclosed in a casing, which method includes the steps of: substantially filling said gap with a vaporous material formed by heating in said shell a dielectric liquid composed of a dielectric oil and an auxiliary substance which auxiliary substance is expelled from said dielectric liquid upon the application of heat; and adding additional quantities of said auxiliary substance to said dielectric oil to compensate for any of said vaporous material which may escape from said casing.

15. A combination as defined in claim 11 in which said rotor means includes a plurality of rotors respectively adjacent said stators but spaced from each other, and walls extending between said rotors and bounding said gap.

16. A combination as defined in claim 11 in which said stators are superimposed one above another whereby said gap extends vertically and whereby said vaporous material moves upward in said gap, and including throttle means communicating with the uppermost portion of said gap for retarding the upward flow of vaporous material in said gap.

17. In a dynamo-electric machine, the combination of: a shell; a plurality of superimposed stators in said shell and providing rotor openings in alignment with each other, said stators being spaced from each other to provide spaces therebetween; a rotor means in said rotor openings and cooperating with the walls of said rotor openings in providing a plurality of gaps spaced from each other by said spaces between said stators; means for maintaining said gaps substantially filled with a vaporous material, said means including a dielectric liquid in said shell and tending to fill said gaps and capable when heated to a given temperature of giving off a vaporous material and including a heating means for heating said dielectric liquid to said given temperature and for heating said gaps to said given temperature, thereby maintaining vaporous material in said gaps; and means extending into said spaces for guiding the vaporous material discharged from each gap into the gap thereabove.

18. In a dynamo-electric machine, the combination of: a shell; a rotor and a stator in said shell and defining a gap therebetween; a rotatable member operatively connected to said rotor; walls forming an annular space around a portion of said rotatable member; and means for delivering to said space a vaporous material, said means including a dielectric liquid in said shell and capable of expelling a vaporous material when heated to a given temperature, and including a pipe with one end in communication with said dielectric liquid and discharging into said annular space and including a heater for heating the interior of said pipe to a temperature at least as high as said given temperature, whereby vaporous material is delivered to said annular space.

19. A combination as defined in claim 18 in which said heater is of annular form and surrounds said pipe.

CLARENCE J. COBERLY.